United States Patent
Suzuki et al.

(10) Patent No.: US 7,366,491 B1
(45) Date of Patent: *Apr. 29, 2008

(54) NOISE CANCEL CIRCUIT

(75) Inventors: Hirohisa Suzuki, Gunma-ken (JP); Masaaki Taira, Akashi (JP)

(73) Assignee: Sanyo Electric Co., Ltd., Osaka (JP)

( * ) Notice: Subject to any disclaimer, the term of this patent is extended or adjusted under 35 U.S.C. 154(b) by 393 days.

This patent is subject to a terminal disclaimer.

(21) Appl. No.: 09/603,184

(22) Filed: Jun. 26, 2000

(30) Foreign Application Priority Data

Jun. 29, 1999 (JP) ............................ 11-184129

(51) Int. Cl.
*H04B 1/10* (2006.01)

(52) U.S. Cl. .................. 455/296; 455/297; 455/22; 381/94.1

(58) Field of Classification Search ............. 455/296, 455/297, 303, 310–312, 501, 63.1, 67.13, 455/67.11, 570, 222, 226.1, 278.1, 283, 114.2, 455/306, 22; 375/296, 254, 346; 381/58, 381/71.1, 94.1, 94.4

See application file for complete search history.

(56) References Cited

U.S. PATENT DOCUMENTS

| | | | |
|---|---|---|---|
| 5,022,023 A | | 6/1991 | Toyoguchi |
| 5,097,460 A | | 3/1992 | Camps et al. |
| 5,113,388 A | | 5/1992 | Yamada et al. |
| 5,199,048 A | * | 3/1993 | Wakabayashi ............... 455/223 |
| 5,204,849 A | | 4/1993 | Yamada et al. |
| 5,255,255 A | | 10/1993 | Kaneda et al. |
| 5,337,089 A | * | 8/1994 | Fisch .......................... 348/448 |
| 5,416,763 A | | 5/1995 | Ohsaki |
| 5,630,217 A | * | 5/1997 | Matsumoto .................. 455/222 |
| 5,828,467 A | * | 10/1998 | Suziki ......................... 382/268 |
| 5,867,535 A | * | 2/1999 | Phillips ....................... 375/295 |
| 5,903,819 A | * | 5/1999 | Romesburg .................. 455/63 |
| 5,929,936 A | * | 7/1999 | Arai et al. ................... 348/607 |
| 6,411,333 B1 | * | 6/2002 | Auld et al. .................. 348/448 |
| 6,424,154 B1 | * | 7/2002 | Young ......................... 324/318 |
| 6,690,805 B1 | * | 2/2004 | Tsuji et al. ................. 381/94.1 |

FOREIGN PATENT DOCUMENTS

JP 61-296825 12/1986

* cited by examiner

*Primary Examiner*—Joseph Feild
*Assistant Examiner*—Pierre-Louis Desir
(74) *Attorney, Agent, or Firm*—Hogan & Hartson LLP

(57) ABSTRACT

A raw signal is delayed in a delay circuit (1) and then supplied to one of the input terminals of a selection circuit (8). The raw signal is also supplied to another delay circuit (2) to be delayed. Subsequently, data of this delayed signal is processed by spline interpolation in an interpolation circuit (4), and the interpolation values are supplied to the other of the input terminals of the selection circuit (8). Further, a timer (7) is operated according to an output signal from a noise detection circuit (6) which detects noise in the raw signal. When noise is detected, the selection circuit (8) switches to select the output from the interpolation circuit (4), thereby achieving interpolation of noisy sections.

12 Claims, 5 Drawing Sheets

NOISE CANCEL CIRCUIT

BACKGROUND OF THE INVENTION

1. Field of the Invention

The present invention relates to a noise cancel circuit which removes noise using an interpolation technique.

2. Description of the Background Art

Generally, when a pulse noise generated by a vehicle engine overlaps with the audio band, a car radio receiver will produce an audible noise unpleasant to listeners. To prevent this, radio receivers usually include a noise cancel circuit. Such a noise cancel circuit removes a pulse noise from an audio signal by performing pre-hold processing on the signal during noise generation. A conventional noise cancel circuit is shown in FIG. 3.

In FIG. 3, an input signal including noise is supplied via the input terminal 31 to the delay circuit 32 and HPF 33. After passing through the HPF 33, if noise exceeding a certain predetermined level is detected by the noise detection circuit 34, the noise detection circuit 34 produces an output pulse. The output pulse is applied to the gate generation circuit 35, which generates a gate signal having a predetermined width.

In response to the gate signal, the switch 36 is turned off. As a result, application of a pilot cancel signal to the subtraction circuit 37 is stopped, thereby allowing the output signal from the delay circuit 32 to be supplied to both input terminals of the subtraction circuit 37. The output AC signal from the delay circuit 32 is canceled by the subtraction circuit, and the DC voltage between the two ends of the capacitor 38 results at the output end of the subtraction circuit 38. The delay time of the delay circuit 32 equals the time required for the processing from the HPF 33 to the switch 36. In this way, noise within the input signal is removed. Subsequently, when the gate signal generation is stopped, the switch 36 is turned on, and the pilot cancel signal is applied to the subtraction circuit 37. The pilot signal component within the input signal is then canceled by the subtraction circuit 37.

However, as the frequency band of noise such as pulse noise is often within the audio frequency band, the noise removal by pre-hold processing removes not only noise, but also sound. While noise removal by pre-hold processing may produce an output that sounds improved to the ear, the pre-hold processing also actually decreases the distortion factor, thereby newly introducing deterioration of sound quality.

SUMMARY OF THE INVENTION

The object of the present invention is to provide a noise cancel circuit for removing noise, such as pulse noise, from an audio signal while minimizing decrease in the distortion factor.

According to the present invention, during pulse noise generation, interpolation is performed on the noise portion of a detected radio signal. As a result, the noise portion is interpolated to a smooth curve, and the distortion factor of the detected radio signal can be improved.

DESCRIPTION OF THE PREFERRED EMBODIMENT

Figure 1:
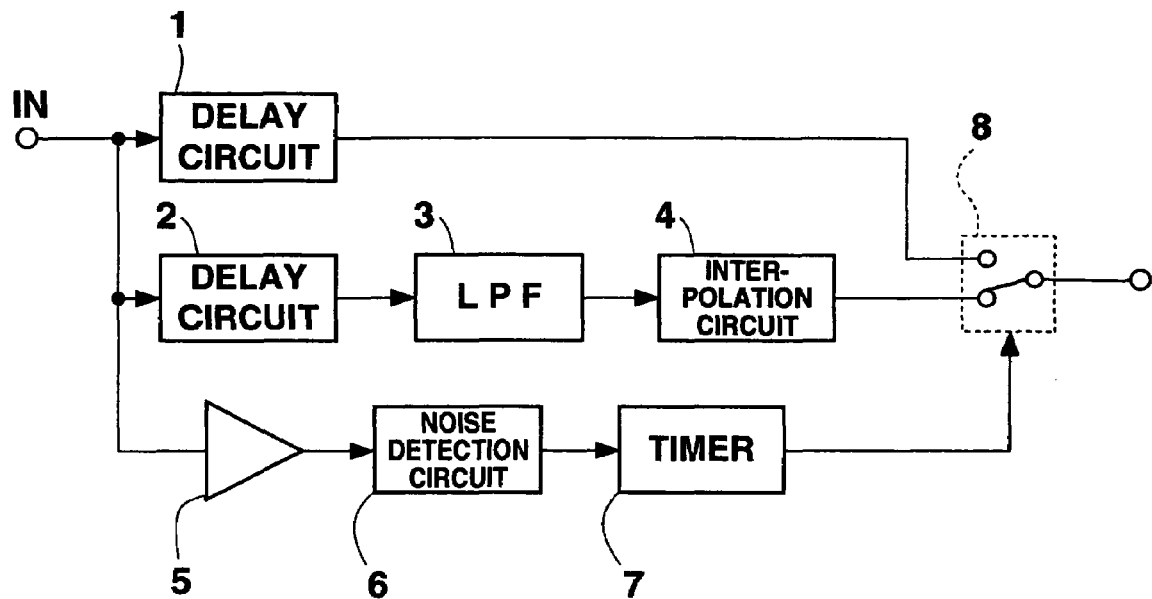
FIG. 1 is a block diagram illustrating an embodiment of the present invention.

FIG. 1 is a block diagram illustrating a preferred embodiment of the present invention. Numerals 1 and 2 denote delay circuits which are supplied with a signal such as a detected FM signal. 3 is an LPF which passes only a predetermined band within the output signal from delay circuit 2. 4 is an interpolation circuit for interpolating a data of a time point using data of previous and later time points. 5 denotes an AGC amplifier which detects the magnitude of white noise and performs amplification while suppressing the white noise level. 6 is a noise detection circuit for detecting pulse noise in the output signal from the AGC amplifier 5. 7 is a timer for counting during a predetermined time period T according to the output signal from the noise detection circuit 6, and generating an output signal during the counting. 8 denotes a selection circuit for selecting an output signal from either the delay circuit 1 or the interpolation circuit 4 depending on the presence of the output signal from the timer 7.

Figure 4:
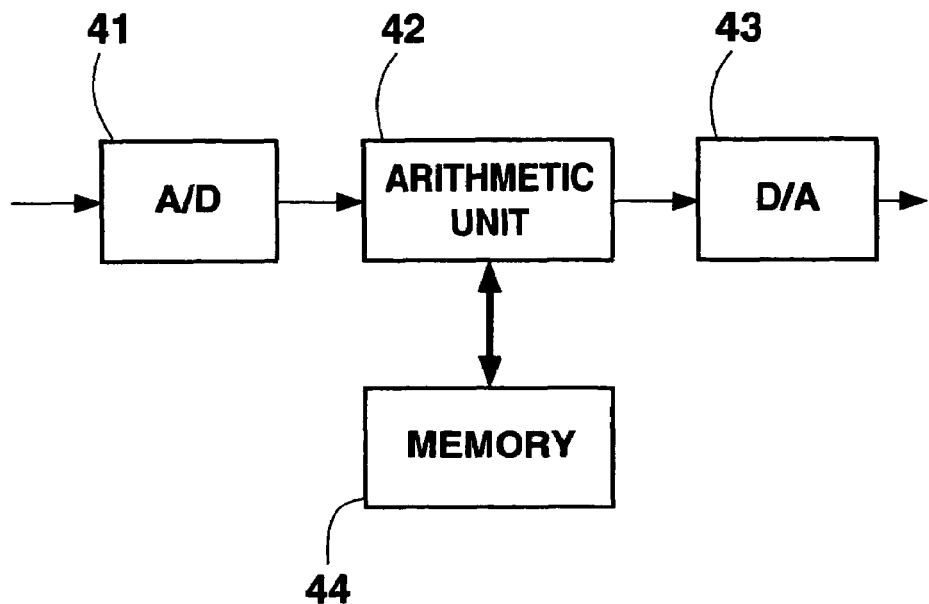
FIG. 4 is a block diagram illustrating a specific configuration example of the interpolation circuit 4 in FIG. 1.

In a device employing the arrangement of FIG. 1, a detected FM signal is supplied to three circuits. In delay circuit 1, the detected FM signal is delayed by delay time $\tau1$ and supplied to one of the input terminals of the selection circuit 8. In delay circuit 2, the detected FM signal is delayed by delay time $\tau2$ and supplied to the LPF 3. When the detected FM signal is an FM composite signal, for example, the LPF 3 blocks the sub-signal and the pilot signal by reducing their levels, and allowing only the main signal to be passed. The output signal from the LPF 3 is applied to the interpolation circuit 4 for interpolation processing. By applying only the main signal to the interpolation circuit 4, erroneous processing due to sub-signals and pilot signals is prevented. The interpolation circuit 4 may be configured using a DSP or a logic circuit as shown in FIG. 4, and may comprise an A/D converter 41 for converting the output from the LPF 3 into digital data, an arithmetic unit 42 for performing interpolation processing on the output data from the A/D converter 41, a D/A converter 43 for converting the output from the arithmetic unit 42 into an analog signal, and a memory 44 for storing audio data. For the interpolation processing, spline interpolation, especially Lagrange interpolation, is performed. The interpolation circuit 4 constantly performs the interpolation processing to produce an analog interpolation signal which is supplied to the other of the input terminals of the selection circuit 8.

Further, the detected FM signal is applied to the AGC amplifier 5. When the white noise level is high, the AGC amplifier amplifies the detected FM signal while reducing the gain such that the white noise level becomes suppressed. The output signal from the AGC amplifier is supplied to the noise detection circuit 6. The noise detection circuit 6 extracts and detects the pulse noise components. The detection output signal from the noise detection circuit 6 is applied to the timer 7. The counting operation of the timer 7 is started in response to the input of the detection signal. The timer 7 counts during a predetermined time period T, and generates an output signal during the counting. In response to this output signal, the selection circuit 8 selects the output signal from the interpolation circuit 4 as shown in FIG. 1.

In the arrangement of FIG. 1, when no pulse noise component is detected within the input audio signal, the noise detection circuit 6 generates no output signal. As a result, the selection circuit 8 indicates a state opposite from that shown in FIG. 1, and the audio signal output from delay circuit 1 is transmitted, via the selection circuit 8, to the circuitry of the next stage. When pulse noise components are generated, the selection circuit 8 selects the output signal from the interpolation circuit 4, allowing a signal subjected to interpolation processing in its noise portions to be transmitted to the circuitry of the next stage.

Each of the raw input signal line, the interpolation circuit line, and the noise detection line require different processing time periods. Accordingly, noise cannot be appropriately removed if the processes in those lines are performed without delaying the signals. Delay circuits 1 and 2 are therefore provided to make timing adjustments such that appropriate noise removal can be accomplished.

Figure 6:
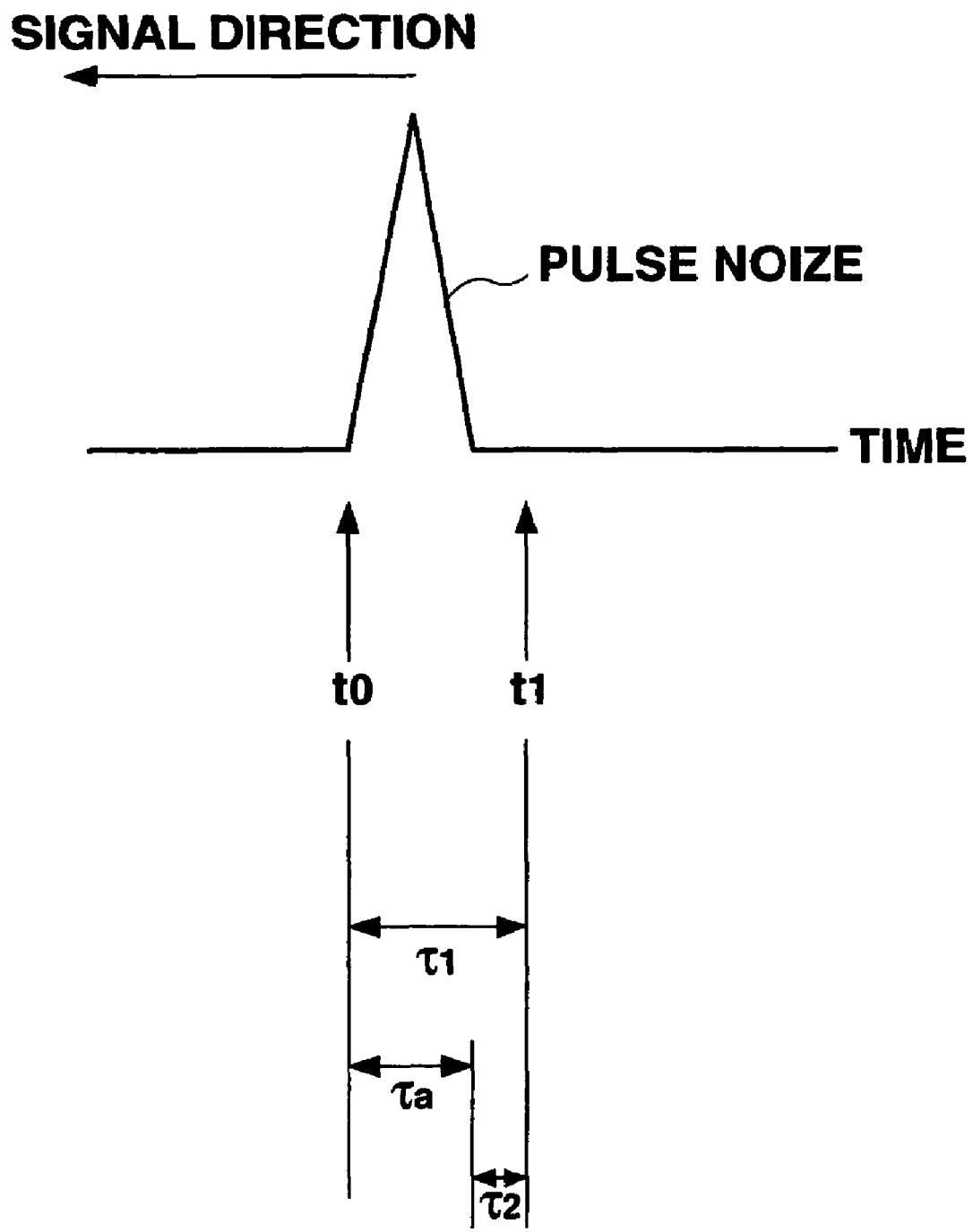
FIG. 6 is a diagram for explaining the timing of pulse removal.

An example case is described below in which a pulse noise is generated at time t0 as shown in FIG. 6. The noise detection circuit 6 detects the pulse noise by detecting a change in the input signal level. The noise detection circuit 6 usually conducts pulse noise detection based on the state of change in the data obtained after performing A/D conversion, thus requiring time for such processing. Because the time point of pulse noise detection is always later than that of the noise generation, and also because performing processing for detection requires a certain amount of time, the time point that the noise detection output signal is generated from the actual noise detection circuit 6 is t1. Delay time τ1 of delay circuit 1 may be designated to correspond to the period of time between time point t1 of the output signal generation from the noise detection circuit 6 and time point t0 of the pulse generation. With this arrangement, the selection circuit 8 can be switched at a timing matching the pulse generation. In the interpolation circuit 4, processing time is similarly required because D/A conversion and interpolation processing are executed. Assuming that the time required for interpolation processing is τa, delay time τ2 of delay circuit 2 may be designated as follows: τ2=τ1−τa (τ1=τ2+τa). According to this arrangement, an interpolation output corresponding to the noise generation time point t1 is supplied from the interpolation circuit 4 via the selection circuit 8 at the timing when the selection circuit 8 is switched. In this way, the timing of the interpolation output is also matched. It should be noted that, in FIG. 6, the timing is illustrated diagrammatically without accurately reflecting the actual scale of the timing. The count time T of the timer 7 is generally set at the pulse width of the pulse noise. Accordingly, the interpolation output from the interpolation circuit 4 is supplied from the selection circuit 8 during a time period corresponding to the generation of the pulse.

Figure 7:
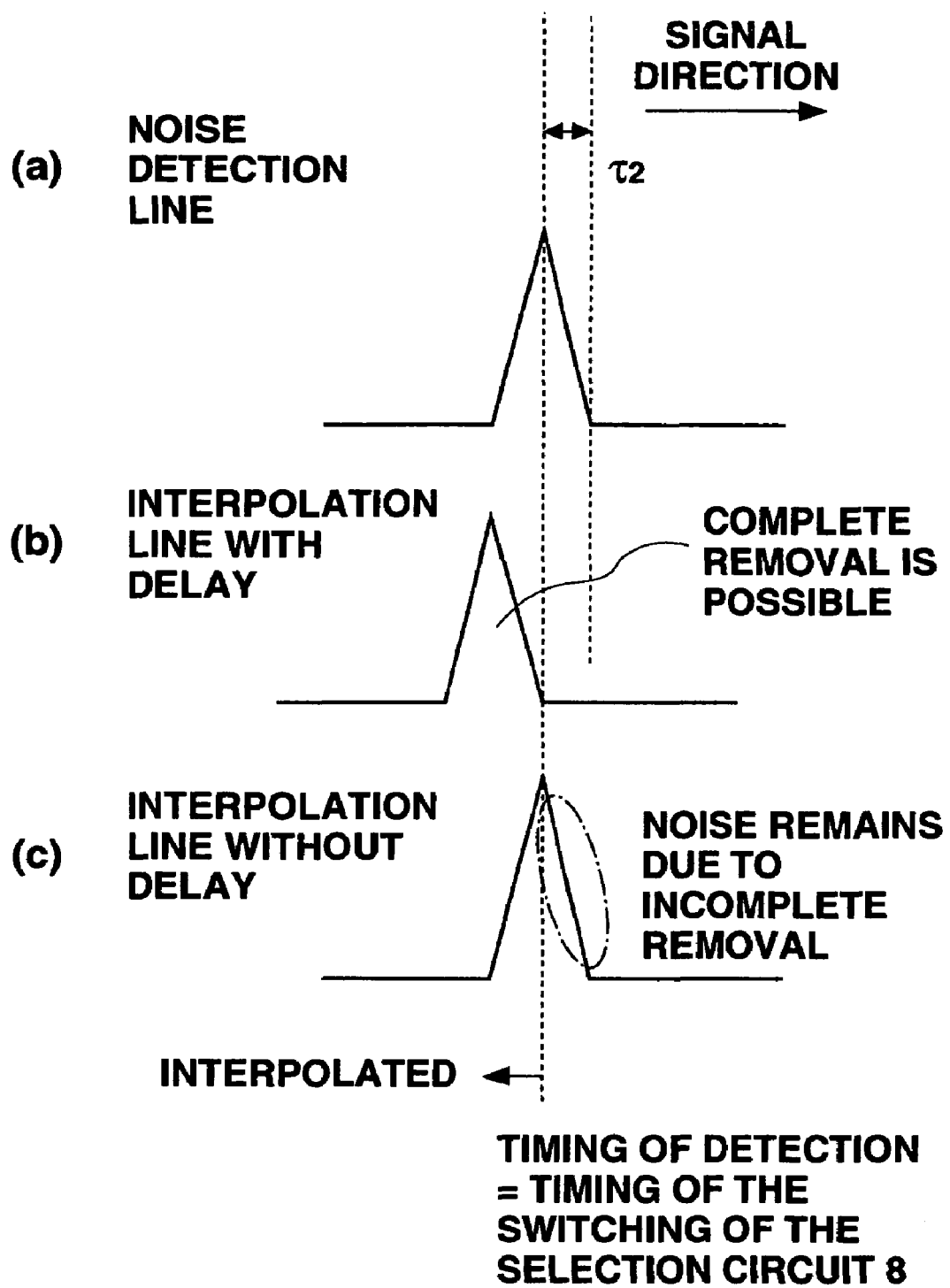
FIG. 7 is another diagram for explaining the timing of pulse removal.

Delay time τ2 is further explained with reference to FIG. 7. In FIG. 7, the processing times of the noise detection circuit 6 and the interpolation circuit 4 are assumed to be 0. Furthermore, the signal forward direction in FIG. 7 is the opposite from FIG. 6.

The noise detection circuit 6 detects a pulse noise at the peak of the noise. If delay circuit 2 is not provided in the interpolation line including the interpolation circuit 4, the latter, not the former, half of the pulse noise can be removed when the selection circuit 8 is switched at the timing of the peak. By inserting delay circuit 2, all pulse noise can be removed. It is to be noted that, in comparison with the detection processing time of the noise detection circuit 6, the interpolation processing time of the interpolation circuit 4 is longer. Accordingly, when taking into account the processing times of both of the circuits, delay time τ2 of delay circuit 2 may be designated shorter than the time period indicated in FIG. 7 by the time period difference between the interpolation processing time and the detection processing time.

The operation of the interpolation circuit 4 is next described referring to FIG. 4. The output data from the A/D converter circuit 41 is transmitted to the arithmetic unit 42 and sequentially stored in the memory 44. The data read out from the memory 44 is used to calculate interpolation data by spline or Lagrange interpolation. The output interpolation data is converted into an analog data by the D/A converter circuit 44 and supplied to the selection circuit 8 in FIG. 1.

Figure 2:
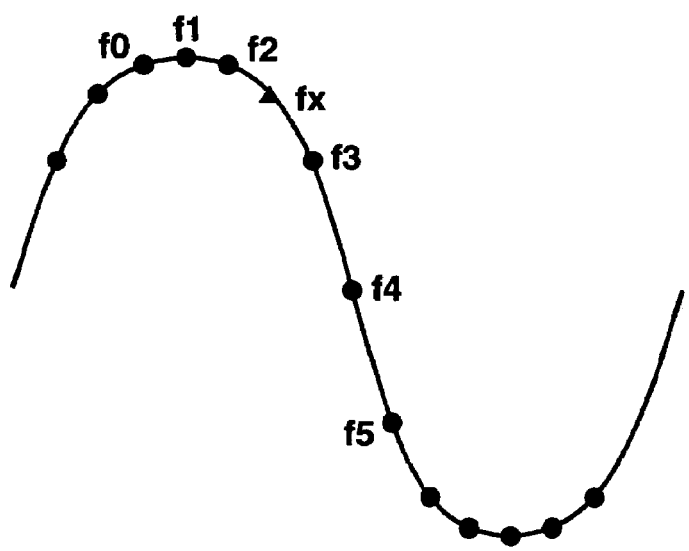
FIG. 2 is a characteristic diagram for explaining the operation according to the present invention.
Figure 3:
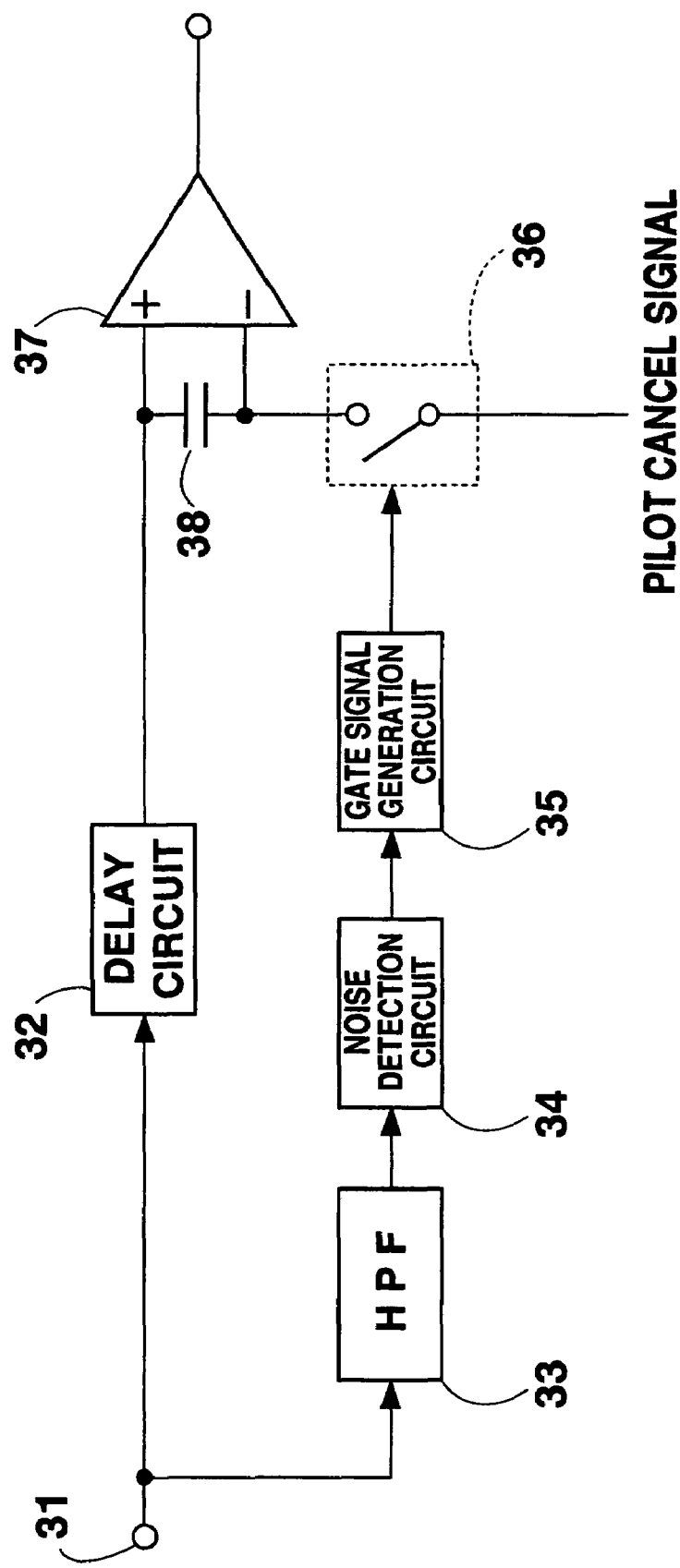
FIG. 3 is a block diagram showing a conventional example.
Figure 5:
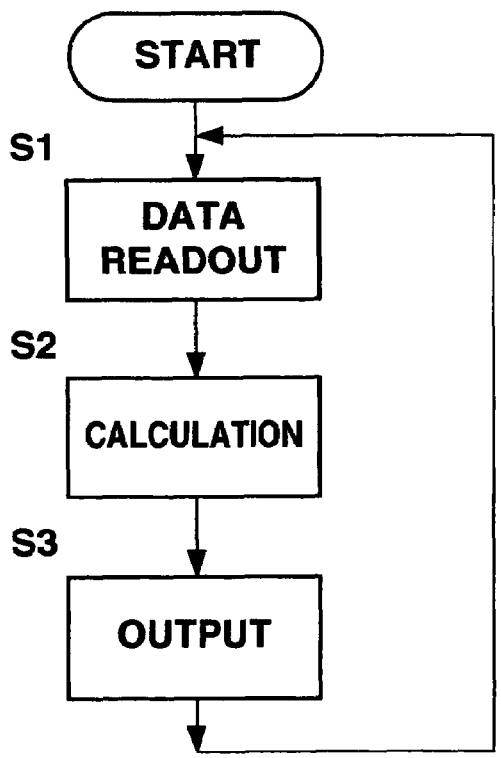
FIG. 5 is a flowchart for explaining the operation according to FIG. 4.

The processing of the arithmetic unit 42 is explained using the flowchart of FIG. 5. With respect to the data to be interpolated, data for three points from previous and later time points, respectively, are read out (S1). Subsequently, interpolation data is calculated using a Lagrange interpolation technique. For example, when point X in FIG. 2 is to be interpolated, data of previous and later time points, data x0 to data x5, and their function values f0 to f5, are read out according to S1. The read out data are substituted in the following equation:

$$P(x) = \sum_{k=0}^{n} L_k(x) f_k \quad (1)$$

$L_k(X)$ is the Lagrange interpolation coefficient, which can be expressed as $$L_k(x) = \frac{(x-x_0)(x-x_1)\ldots(x-x_{k-1})(x-x_{k+1})\ldots(x-x_n)}{(x_k-x_0)(x_k-x_1)\ldots(x_k-x_{k-1})(x_k-x_{k+1})\ldots(x_k-x_n)} \quad (2)$$

Using the example of FIG. 2, the function value f(x) to be interpolated is given by $$P(x)=L(0)f0+L(1)f1+L(2)f2+L(3)f3+L(4)f4+L(5)f5 \quad (3)$$

and can be calculated by substituting the read out data. In this case, the Lagrange interpolation coefficient is $$Lk(x) = \frac{(x-x0)(x-x1)(x-x2)(x-x3)(x-x4)(x-x5)}{(xk-x0)(xk-x1)(xk-x2)(xk-x3)(xk-x4)(xk-x5)} \quad (4)$$

According to this Lagrange interpolation, a smooth curve passing through all given points, points x0 to x5 in FIG. 2, can be obtained. By performing interpolation using this technique, the noise portion of the raw signal can be interpolated into a smooth curve, allowing improvement of the distortion factor.

The calculated value is output from the arithmetic unit 42 (S3), and then the next interpolation data, namely, the interpolation data which corresponds to f3 in FIG. 2, is calculated. The arithmetic unit sequentially calculates interpolation data based on the data stored in the memory 44.

Although Lagrange interpolation is used in the interpolation circuit 4 of the present embodiment to calculate the interpolation value, other interpolation techniques may be used for the calculation of the present invention. Furthermore, a plurality of interpolation techniques may be employed in combination such that the optimal interpolation technique can be selected to calculate the interpolation value according to the condition of noise generation.

According to the present invention, noise portions can be smoothly interpolated by spline interpolation. Sound components are therefore prevented from being deleted by noise removal, allowing further improvement of the distortion factor and sound quality.

What is claimed is:

1. A noise cancel circuit for removing noise components in an input audio signal, comprising:
   an LPF for blocking a sub-signal and a pilot signal in a high frequency band of the input audio signal and passing only a main signal of the input audio signal;
   an interpolation circuit for interpolation processing on the main signal output from the LPF,
   a noise detection circuit for detecting the noise portion of said input audio signal,
   a timer for starting counting in response to an output signal from the noise detection circuit and generating a switching signal during a predetermined period of time while counting is performed; and
   a selection circuit for selecting one of output signals from a delay circuit and the interpolation circuit in accordance with the switching signal, thereby serving to replace the noise portion of said input audio signal with an output signal from said interpolation circuit according to the output signal from said noise detection circuit and outputting a signal subjected to interpolation processing in its noise portion without adding high frequency components removed from the input audio signal.

2. The noise cancel circuit defined in claim 1, wherein said interpolation circuit executes spline interpolation.

3. The noise cancel circuit defined in claim 1, wherein: the noise portion of said input audio signal is interpolated by said interpolation circuit according to an output signal from said noise detection circuit.

4. The noise cancel circuit defined in claim 3, further comprising:
   a first delay circuit for delaying said input audio signal;
   a selection circuit for selecting either the output signal from said interpolation circuit or the delayed input audio signal from said first delay circuit, wherein
   said selection circuit is controlled according to the output signal from said noise detection circuit.

5. The noise cancel circuit defined in claim 4, wherein said interpolation circuit performs interpolation processing and outputs an interpolation signal regardless of presence or absence of noise components.

6. The noise cancel circuit defined in claim 5, further comprising:
   a second delay circuit for delaying said interpolation signal from said interpolation circuit.

7. The noise cancel circuit defined in claim 6, wherein said second delay circuit is disposed in a processing stage prior to said interpolation circuit.

8. The noise cancel circuit defined in claim 6, wherein a delay time of said first delay circuit is determined based on a sum of an interpolation processing time of said interpolation circuit and a delay time of said second delay circuit.

9. The noise cancel circuit defined in claim 8, wherein the delay time of said second delay circuit corresponds to a difference obtained by subtracting the interpolation processing time of said interpolation circuit from a time delay between generation and detection of said pulse noise.

10. The noise cancel circuit defined in claim 1, wherein said input audio signal is an FM radio signal.

11. The noise cancel circuit defined in claim 1, further comprising:
   a timer controlling a timing of changing the noise portion of said input audio signal to the output signal from said interpolation circuit.

12. The noise cancel circuit defined in claim 1, further comprising:
   a switch for changing the noise portion of said input audio signal to the output signal from said interpolation circuit according to the output signal from said noise detection circuit.

* * * * *